US012661662B2

(12) United States Patent
Larsen et al.

(10) Patent No.: US 12,661,662 B2
(45) Date of Patent: Jun. 23, 2026

(54) SYSTEM COMPRISING A DISCHARGE ELECTRODE ASSEMBLY AND AN ELECTROSTATIC PRECIPITATOR UNIT COMPRISING SUCH A SYSTEM

(71) Applicant: exodraft A/S, Langeskov (DK)

(72) Inventors: Anders Høxbro Larsen, Langeskov (DK); Brian Rene Nielsen, Langeskov (DK); Per Holm Hansen, Svendborg (DK)

(73) Assignee: exodraft A/S, Langeskov (DK)

( * ) Notice: Subject to any disclaimer, the term of this patent is extended or adjusted under 35 U.S.C. 154(b) by 337 days.

(21) Appl. No.: 18/435,728

(22) Filed: Feb. 7, 2024

(65) Prior Publication Data

US 2024/0269693 A1 Aug. 15, 2024

(30) Foreign Application Priority Data

Feb. 10, 2023 (EP) .................................... 23156075

(51) Int. Cl.
*B03C 3/70* (2006.01)
*B03C 3/45* (2006.01)
(Continued)

(52) U.S. Cl.
CPC .................. *B03C 3/70* (2013.01); *B03C 3/45* (2013.01); *B03C 3/49* (2013.01); *B03C 3/86* (2013.01)

(58) Field of Classification Search
CPC .... B03C 3/70; B03C 3/86; B03C 3/45; B03C 3/49
See application file for complete search history.

(56) References Cited

U.S. PATENT DOCUMENTS 2,711,224 A 6/1955 Herber
4,077,783 A 3/1978 Honacker
(Continued)

FOREIGN PATENT DOCUMENTS

CN 216844725 U 6/2022
DE 202019101213 U1 3/2019
(Continued)

OTHER PUBLICATIONS

European Search Report for EP 24156715 dated Jul. 1, 2024.
European Search Report for EP 23156075 dated Jul. 14, 2023.

*Primary Examiner* — Robert A Hopkins
(74) *Attorney, Agent, or Firm* — Knobbe, Martens, Olson & Bear, LLP

(57) ABSTRACT

The invention relates to a system comprising a discharge electrode assembly, the system being for an electrostatic precipitator unit. The discharge electrode assembly comprises a discharge electrode to be electrically connected to an associated high voltage generator via an insulator. The connection is established via a connector pin and an insulator connector. The parts comprise a number of mutually engageable locking surfaces designed to prevent mutual translational and rotational movement of the parts. The invention also relates to an electrostatic precipitator unit comprising such a system. The discharge electrode assembly is designed so that it is easier to assemble and arrange correctly in a flow passage of a flue gas passageway than what is known from prior art. In particular, it is designed to provide a lower risk of misalignment of the discharge electrode with respect to the flue gas passage than what is known from prior art.

13 Claims, 7 Drawing Sheets

(51) Int. Cl.

| | |
|---|---|
| ***B03C 3/49*** | (2006.01) |
| ***B03C 3/86*** | (2006.01) |

(56) References Cited

U.S. PATENT DOCUMENTS

| | | | |
|---|---|---|---|
| 4,675,029 | A | 6/1987 | Norman |
| 2014/0083297 | A1 | 3/2014 | Muller et al. |

FOREIGN PATENT DOCUMENTS

| | | | | | |
|---|---|---|---|---|---|
| EP | 2551018 | A2 | | 1/2013 | |
| EP | 3492174 | A1 | | 6/2019 | |
| EP | 4374968 | A1 | | 5/2024 | |
| WO | WO-03100226 | A1 | * | 12/2003 | ............ F01N 13/011 |
| WO | WO 2020/000115 | A1 | | 1/2020 | |

* cited by examiner

SYSTEM COMPRISING A DISCHARGE ELECTRODE ASSEMBLY AND AN ELECTROSTATIC PRECIPITATOR UNIT COMPRISING SUCH A SYSTEM

CROSS REFERENCE TO RELATED APPLICATIONS

This application claims the benefit of priority to European Patent Application No. 23156075.6, filed on Feb. 10, 2023. The disclosure of the above-referenced application is hereby expressly incorporated by reference in its entirety.

FIELD OF THE INVENTION

The present invention relates to a system comprising a discharge electrode assembly, the system being for use in an electrostatic precipitator unit as well as such an electrostatic precipitator unit. In particular, it relates to such a system being designed to ensure that the different parts of the discharge electrode assembly remain aligned and in the correct mutual positions and orientations.

BACKGROUND OF THE INVENTION

An electrostatic precipitator (ESP) unit can be used for reducing the number of fine and ultrafine particles in an aerosol or a flow of flue gas from e.g. a wood-burning stove or a pellet boiler. In an ESP, an electric field is generated by a discharge electrode connected to a high voltage generator. The electric field causes the aerosol or flue gas around the discharge electrode to become ionized. Hereby either free electrons or charged gas molecules become trapped on the particles and thereby charge the particles. The charged particles are repulsed from the discharge electrode towards a grounded collection electrode on which they settle and build up and from where they can subsequently be removed in a controlled manner. Hereby the amount of pollution can be significantly lowered.

In order to ensure a correct and efficient functioning of an ESP, it is important that the discharge electrode is arranged centrally in the flow passage along its full length, the flow passage forming part of a flue gas passageway. The discharge electrode and the parts of the electrostatic precipitator unit with which it is mechanically connected comprise several mutually connected components, and it can therefore be difficult to ensure a correct arrangement of the discharge electrode. Each point of assembly presents a risk of errors with respect to both translation and rotation. Therefore, both the initial installation and re-assembly after regular cleaning of the discharge electrode and the flow passage provide challenges for the person performing the job.

Hence, an improved discharge electrode assembly would be advantageous.

OBJECT OF THE INVENTION

It is an object of the present invention to provide a system comprising a discharge electrode assembly which system is easier to assemble and arrange correctly in relation to a flow passage than what is known from prior art.

It is another object of the present invention to provide a system comprising a discharge electrode assembly, the system having a lower risk of misalignment of the discharge electrode with respect to the flow passage in which it is arranged than what is known from prior art.

It is an object of at least some embodiments of the present invention to provide a system comprising a discharge electrode assembly which facilitates cleaning of the discharge electrode itself as well as the flow passage in which it is arranged than what is known from prior art.

It is a further object of the present invention to provide an alternative to the prior art.

In particular, it may be seen as an object of the present invention to provide a discharge electrode assembly that solves the above-mentioned problems of the prior art.

SUMMARY OF THE INVENTION

The above-described object and several other objects are intended to be obtained in a first aspect of the invention by providing a system for an electrostatic precipitator unit, the electrostatic precipitator unit being for insertion in a flue gas passageway, such as a chimney, the system comprising:

- a flue gas inlet for receiving a flow of flue gas,
- a flue gas outlet for venting the flow of flue gas,
- a pipe forming a flow passage extending between the flue gas inlet and the flue gas outlet, and
- a discharge electrode assembly,
- wherein the discharge electrode assembly comprises:
- a discharge electrode arranged in the flow passage and configured to be electrically connected to an associated high voltage generator for providing an electric field being generated in a region around the discharge electrode during use,
- an insulator configured to be arranged between the associated high voltage generator and the discharge electrode during use, the insulator having a longitudinal axis fixedly arranged parallel to a central axis of the pipe forming the flow passage,
- a connector pin connected to the discharge electrode at a first end, and
- an insulator connector connecting the insulator and a second end of the connector pin,
- wherein:
- the connector pin comprises a first locking surface at the first end and a second locking surface at the second end,
- the discharge electrode comprises a third locking surface at an upper end,
- the insulator connector comprises a fourth locking surface and a fifth locking surface, and
- the insulator comprises a sixth locking surface,
- wherein:
- the first and the third locking surfaces are configured to form a fixed mutual engagement preventing translational and rotational movement of the discharge electrode in relation to the connector pin,
- the second and the fourth locking surfaces are configured to form a fixed mutual engagement preventing translational and rotational movement of the connector pin in relation to the insulator connector, and
- the fifth and the sixth locking surfaces are configured to form a fixed mutual engagement preventing translational and rotational movement of the insulator connector in relation to the insulator, so that when all the locking surfaces are in their respective mutual engagements, a longitudinal axis of the discharge electrode is aligned with the central axis of the pipe.

In order for the system to function as intended, the system is designed and installed so that the insulator has a longitudinal axis fixedly arranged parallel to a central axis of the pipe forming the flow passage. This can e.g. be obtained by mounting the isolator to a plate forming part of a casing of the system as will be shown in the figures.

The design of the different components of the system, and in particular of the discharge electrode assembly, and the way components are connected provide a number of advantages. The various locking surfaces and the engagement between them ensure that all the components are in the correct location and thereby that the discharge electrode assembly works as intended. The system comprising the discharge electrode assembly is designed for use in an electrostatic precipitator unit for insertion in a flue gas passageway, such as a chimney, as will be described in further details below. The efficiency of such an electrostatic precipitator unit is dependent on the discharge electrode being arranged centrally in the flow passage and aligned therewith. Therefore, the discharge electrode assembly has been designed so that that it is easy and efficient to ensure such correct positioning in the flow passage which forms part of the flue gas passageway.

In presently preferred embodiments of the invention, the mutual engagement between the first and the third locking surfaces is releasable, and/or the mutual engagement between the second and the fourth locking surfaces is releasable. Hereby it is obtained that it is easy and efficient to ensure a correct positioning of the discharge electrode after a temporary removal of the discharge electrode for cleaning of the discharge electrode itself as well as the flow passage in which it is arranged during use.

In some embodiments of the invention, the first locking surface is a protrusion extending from the first end of the connector pin, and the third locking surface is a locking hole matching the shape and dimensions of the protrusion. The two parts are then preferably connected, e.g. by use of a matching screw, to ensure that they remain connected. Other means of connecting are also covered by the scope of protection. The first and third locking surfaces may e.g. be kept in place by a press fit, a pin or a clamp.

In some embodiments of the invention,

- the second locking surface is a recess in the connector pin, and
- the fourth locking surface is a combination of:
  - a guiding hole in the insulator connector configured to receive the second end of the connector pin, and
  - a set screw configured to fixedly engage with the recess when the connector pin is at a predefined position in the guiding hole.

In such embodiments, the insulator connector may comprise the guiding hole, and the connector pin may be configured to slide along the guiding hole in the insulator connector to allow for movement of the discharge electrode relative to the insulator. Hereby it is possible and easy to move the discharge electrode sideways away from the normal central position in a flow passage in a guided manner. This movement will be relevant for regular cleaning of the discharge electrode and/or the flow passage. An example of such an embodiment will be shown in the figures.

The discharge electrode may comprise a first discharge electrode part and a second discharge electrode part, which first and second discharge electrode parts are aligned and releasably and fixedly connected to each other during use of the discharge electrode. Hereby a higher freedom is obtained with respect to the shape of the discharge electrode than if it had been made as a unitary element. An example of such a presently preferred design will be shown in the figures. Such a design allows for an efficient establishment of the third locking surface and the associated engagement with the first locking surface; this will be seen from the figures. Furthermore, it is an efficient way of increasing the stiffness and thereby a lowering the risk of damage and misalignment of the discharge electrode. The first and second discharge electrode parts may e.g. be assembled by rivets, screws, or bolts.

In a second aspect, the invention relates to an electrostatic precipitator unit for insertion in a flue gas passageway, such as a chimney, the electrostatic precipitator unit comprising:

- a system according to the first aspect of the invention,
- a high voltage generator connected to the discharge electrode for providing an electric field being generated in a region around the discharge electrode, when the high voltage generator is turned on, and
- a controller for controlling the operation of the high voltage generator and the discharge electrode.

As mentioned above, this is the intended use for which the system according to the first aspect of the invention has been developed. Therefore, some of the advantages of embodiments of the system, and in particular the discharge electrode assembly thereof, are most clearly understood in combination with the second aspect of the invention. The above-given comments on the different embodiments therefore also applies to an electrostatic precipitator unit according to the second aspect.

In some embodiments of the invention, the electrostatic precipitator unit further comprises a casing extending laterally from the pipe, the casing comprising:

- a first compartment adjacent to the pipe, and
- a second compartment at a distance from the pipe and separated from the first compartment by a heat shield plate along at least a part of a height of the first compartment, wherein the controller and the high voltage generator are arranged:

- in the second compartment, or
- in a third compartment adjacent to and at least partly separated from the second compartment by a mounting plate supporting the high voltage generator and the controller, and wherein walls of the casing are provided with:

- at least one lower hole at a lower region of the second compartment, and
- at least one upper hole at an upper region of the second compartment, the at least one lower hole being configured to allow air to be drawn into the second compartment from the surroundings and the at least one upper hole being configured to allow air to be vented out of the second compartment thereby causing a flow of air along the second compartment as a result of thermal convection caused by hot flue gas flowing in the flow passage during use of the electrostatic precipitator unit.

When it is desired to provide an existing chimney with an electrostatic precipitator unit according to the present invention, a part of the chimney is removed and replaced by the electrostatic precipitator unit.

The feature that the casing extends laterally from the pipe comprises embodiments wherein the casing surrounds the pipe and embodiments wherein the casing is joined with the pipe so that they form one element. An example of a design of the casing will be shown in the figures. The casing will typically be made from stainless steel, but other materials which can withstand the high temperatures can also be used.

The heat shield plate is used to reduce the thermal radiation from the pipe heated by the hot flue gas flowing therein. Thermal radiation is electromagnetic radiation generated by the thermal motion of particles in matter. It is generated when heat from the movement of the material is converted to electromagnetic radiation. The heat shield plate reflects and possibly also absorbs some of the thermal radiation so that only a reduced amount of heat is transmitted into the second compartment.

In the second compartment, a large part of the heat is removed by convection, and therefore, the present invention is based on the combined protective effect of the heat shield plate and the convection area in the second compartment.

Convection can be defined as the transfer of heat form one place to another due to the movement of fluid. When natural buoyancy forces alone are responsible for fluid motion when the fluid is heated, the process is typically called "natural convection". An example of this is the draft in a chimney such as in relation to the present invention. The arrangement of the at least one lower hole and the at least one upper hole at the lower and upper regions, respectively, of the second compartment, results in the main direction of the flow of air in the second compartment being vertically upwards. This flow of air means that hot air in the second compartment is removed by natural convection, and this results in a cooling whereby it can be ensured that the controller and the high voltage generator are not subjected to too high temperatures.

When the electrostatic precipitator unit is arranged in a chimney of a pellet burner, the temperature of the flue gas is typically in the order of up to 250 degrees Celsius. Tests have shown that by use of the present invention, it is possible to keep the temperature at the location of the controller and the high voltage generator below 50 degrees Celsius.

The casing may be provided with more holes than those mentioned above. It may e.g. be provided with holes in the part of the walls forming the first compartment in order to obtain additional cooling thereof. The at least one lower hole and the at least one upper hole are preferably arranged with as large vertical distance from each other as possible for a given size of the casing in order to provide venting of most of the second compartment. Typically there will be a plurality of lower holes and a plurality of upper holes; an example of such an embodiment will be shown in the figures.

In embodiments of the invention comprising a heat shield plate as just described, the heat shield plate may be bent or curved so that a horizontal distance between the heat shield plate and both the controller and the high voltage generator is larger adjacent to the walls of the casing than midway between the walls of the casing. Hereby it is ensured that there is as much space as possible for the flow of air along the second compartment so that an efficient cooling is ensured.

In presently preferred embodiments of the invention, both the at least one lower hole and the at least one upper hole are provided in two opposing walls of the casing. Hereby a widespread flow of air is obtained whereby it can be ensured that substantially all of the second compartment is efficiently cooled by the natural convection.

The insulator may be arranged in a fourth compartment of the casing, the fourth compartment being above and at least partly separated from the second or third compartment in which the controller and the high voltage generator are arranged. The insulator is connected to the discharge electrode via an opening in the pipe, and hot flue gas and ash may exit the pipe via the same opening. Therefore, by arranging the insulator in such a fourth compartment, it can be obtained that this flue gas and ash do not reach and possibly cause damage to the controller and the high voltage generator.

The controller and the high voltage generator may be arranged in a control box forming a unitary enclosure. Such a control box can provide protection against heat, moisture, and dirt. Furthermore, it can facilitate the installation and possible subsequent maintenance, because the control box can be handled as a separate unit.

A shortest horizontal distance between the pipe and the heat shield plate may be at least 10 mm, such as at least 13 mm, such as at least 15 mm. A shortest horizontal distance between the heat shield plate and both the controller and the high voltage generator may be at least 15 mm, such as at least 18 mm, such as at least 20 mm. These two measures have been found suitable at least for an electrostatic precipitator unit designed for use in a chimney with a flue pipe having a diameter of around 150 mm. However, similar distances may also be used for larger or smaller units.

An electrostatic precipitator unit according to the second aspect of the invention may further comprise a brush stop configured to be arranged at the flue gas outlet and extending across the flow passage, the brush stop being configured to prevent a sweeping brush from passing the brush stop when the unit is inserted in the flue gas passageway. In order to facilitate cleaning of the part of the flue gas passageway below the brush stop, it will typically be detachably arranged. It may be fully removable, or it may be hingely connected.

The first and second aspects of the present invention may be combined. These and other aspects of the invention will be apparent from and elucidated with reference to the embodiments described hereinafter.

BRIEF DESCRIPTION OF THE FIGURES

The system and the electrostatic precipitator unit according to the invention will now be described in more detail with regard to the accompanying figures. The figures show one way of implementing the present invention and is not to be construed as being limiting to other possible embodiments falling within the scope of the attached claim set.

DETAILED DESCRIPTION OF AN EMBODIMENT

Figure 1:
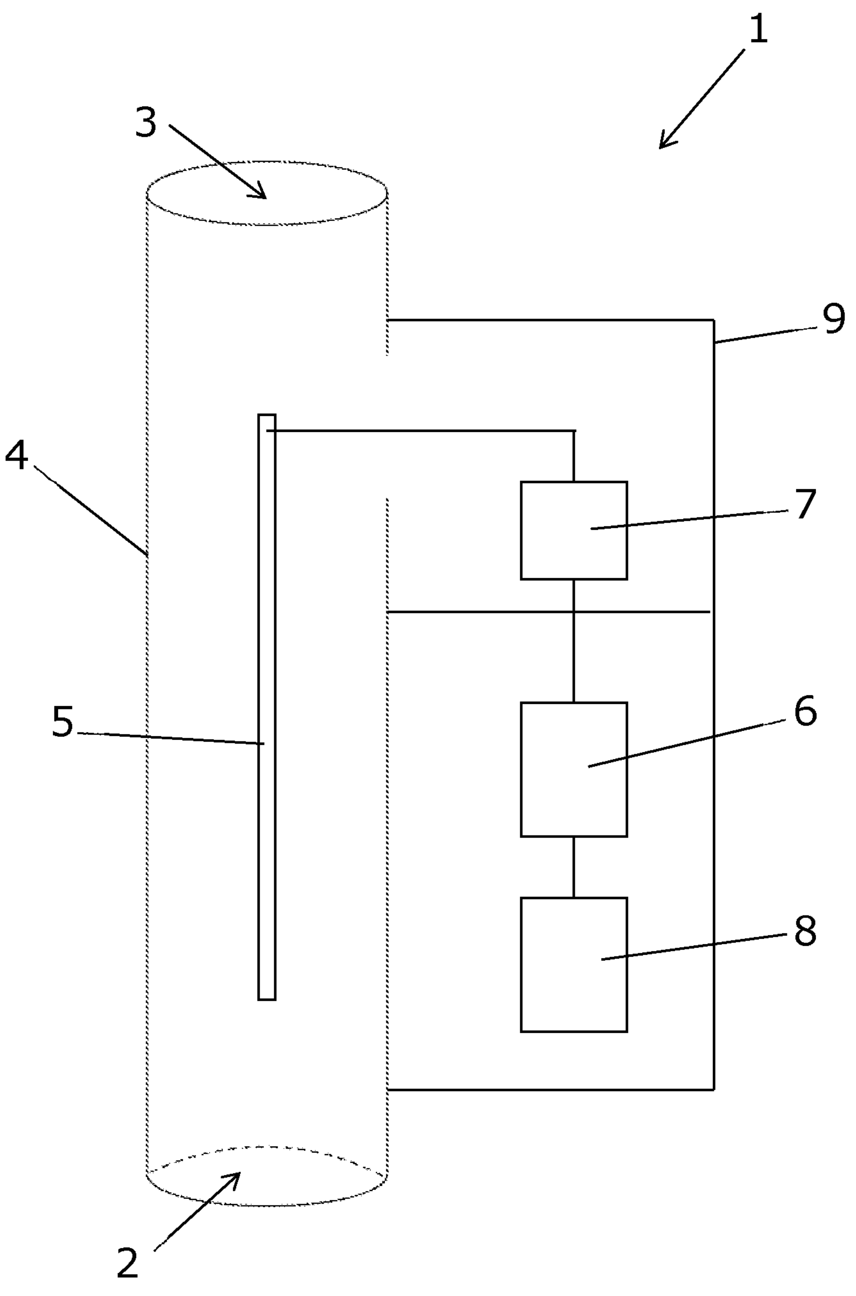
FIG. 1 schematically shows the different parts of an electrostatic precipitator unit according to the second aspect of the present invention.
Figure 4A:
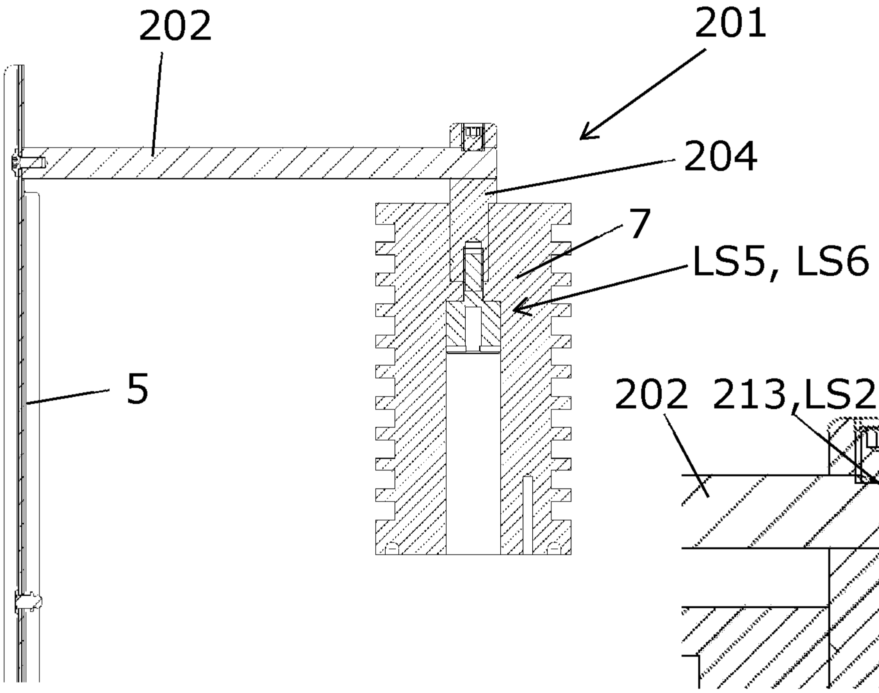
FIGS. 4A, 4B, and 4C schematically show the connection between the connector pin and the isolator in FIGS. 2A and 2B.

FIG. 1 schematically shows the different parts of an electrostatic precipitator unit 1 according to the second aspect of the present invention as well as their mutual locations. As mentioned above, this is the use for which the system according to the first aspect of the invention has been developed. The electrostatic precipitator unit 1 comprises a flue gas inlet 2 for receiving a flow of flue gas, a flue gas outlet 3 for venting the flow of flue gas, and a pipe 4 forming a flow passage extending between the flue gas inlet 2 and the flue gas outlet 3. A discharge electrode 5 is arranged in the flow passage, preferably centrally arranged as that improves the efficiency thereof. A high voltage generator 6 is connected to the discharge electrode 5 for providing an electric field being generated in a region around the discharge electrode 5, when the high voltage generator 6 is turned on. An insulator 7 is arranged between the high voltage generator 6 and the discharge electrode 5. A possible design of the insulator 7 is shown in FIGS. 4A and 4C. The electrostatic precipitator unit 1 comprises a controller 8 for controlling the operation of the high voltage generator 6 and the discharge electrode 5. In the illustrated embodiment, a casing 9 extends laterally from the pipe 4, the casing 9 accommodating the controller 8 and the high voltage generator 6.

Figure 2A:
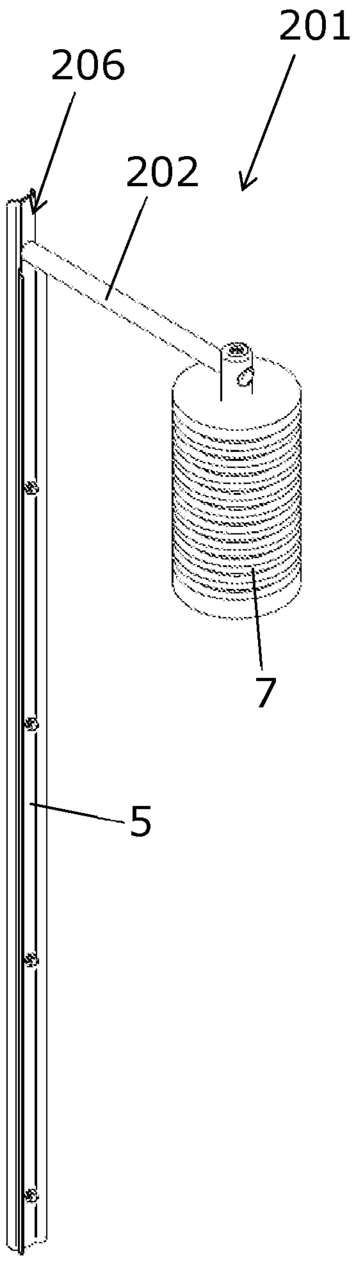
FIGS. 2A and 2B schematically show an assembled and an exploded view, respectively, of a discharge electrode assembly for incorporation in a system according to the first aspect of the present invention.
Figure 2B:
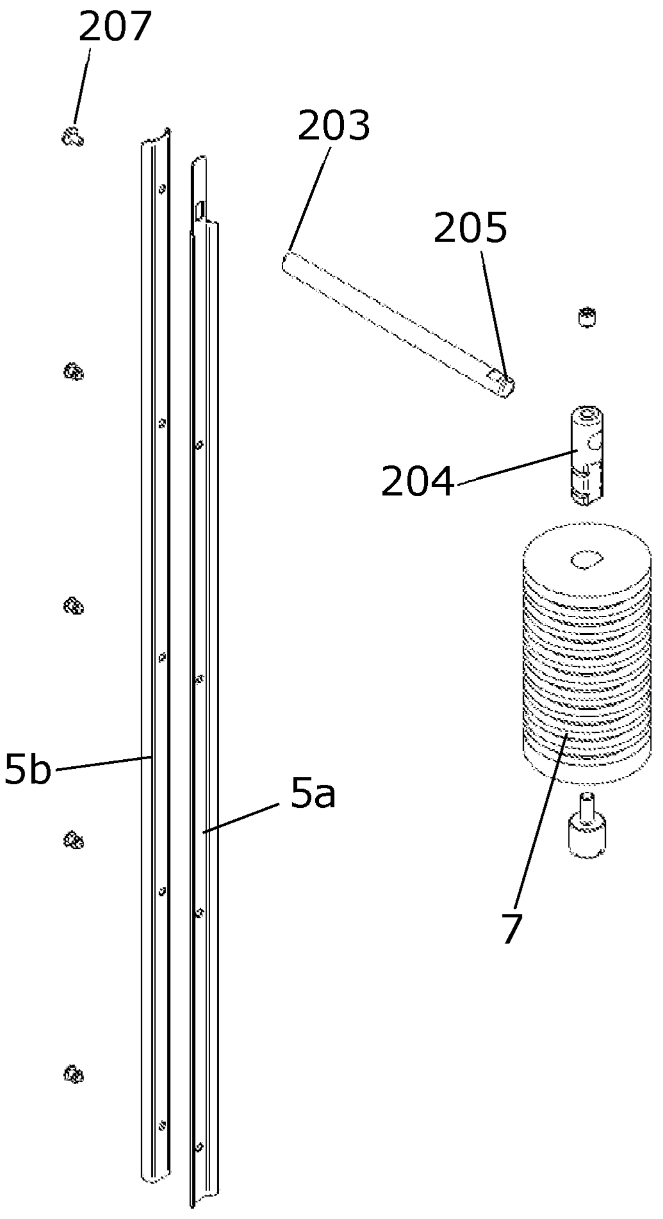

FIGS. 2A and 2B schematically show an assembled and an exploded view, respectively, of a discharge electrode assembly 201 for use in a system according to an embodiment of the present invention. The discharge electrode assembly 201 comprises a discharge electrode 5 configured to be electrically connected to an associated high voltage generator 6 for providing an electric field being generated in a region around the discharge electrode 5 during use, as explained in relation to FIG. 1. It further comprises an insulator 7 which is configured to be arranged between the high voltage generator 6 and the discharge electrode 5 during use. A connector pin 202 is connected to the discharge electrode 5 at a first end 203, and an insulator connector 204 connects the insulator 7 and a second end 205 of the connector pin 202. The connector pin 202 comprises a first locking surface LS1 at the first end 203 and a second locking surface LS2 at the second end 205. Details of all the locking surfaces will be given in relation to the following figures. The discharge electrode 5 comprises a third locking surface LS3 at an upper end 206, and the insulator connector 204 comprises a fourth locking surface LS4. As explained above, the first and the third locking surfaces LS1,LS3 are configured to form a fixed mutual engagement preventing translational and rotational movement of the discharge electrode 5 in relation to the connector pin 202, and the second and the fourth locking surfaces LS2,LS4 are configured to form a fixed mutual engagement preventing translational and rotational movement of the connector pin 202 in relation to the insulator connector 204. In the illustrated embodiment, the discharge electrode 5 comprises a first discharge electrode part 5*a* and a second discharge electrode part 5*b*, which first and second discharge electrode parts 5*a*,5*b* are aligned and releasably and fixedly connected to each other during use of the discharge electrode 5. In this embodiment, the connection between the first and second discharge electrode parts 5*a*,5*b* is performed by use of rivets 207; the number of these may differ from what is shown in the figure.

Figure 3A:
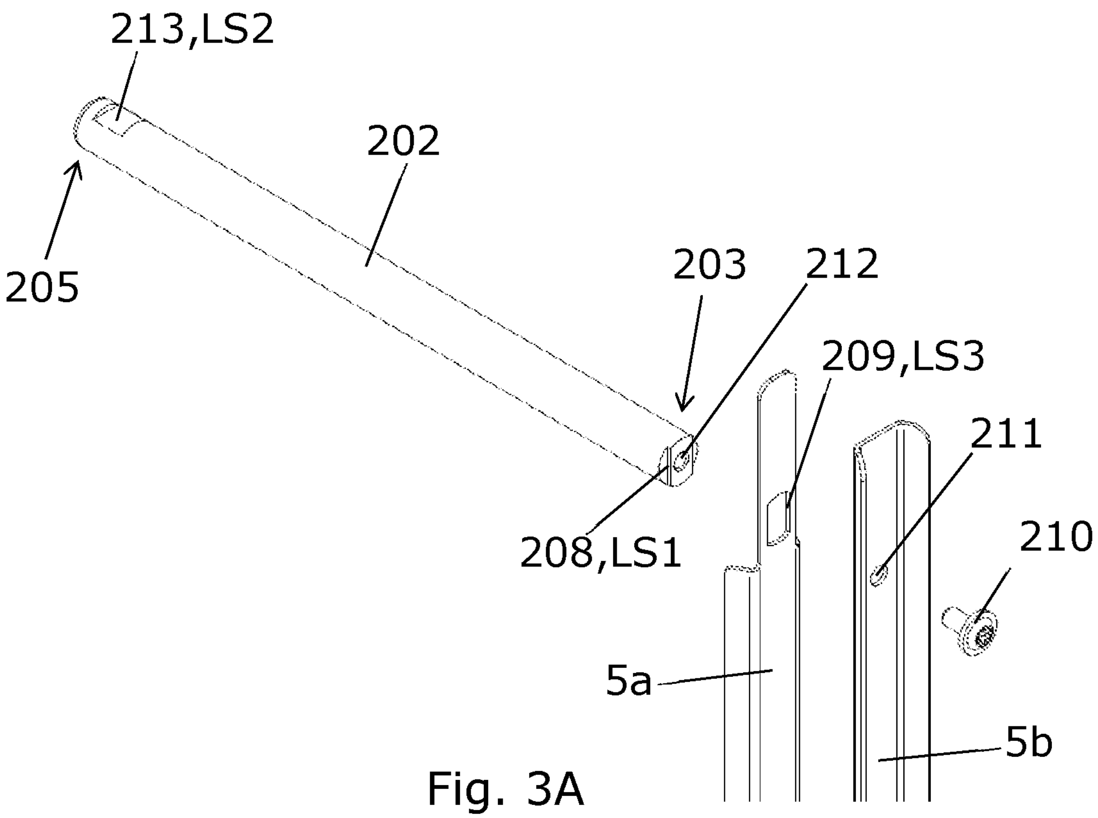
FIGS. 3A, 3B, and 3C schematically show the region around the connection between the connector pin and the discharge electrode in FIGS. 2A and 2B.
Figure 3B:
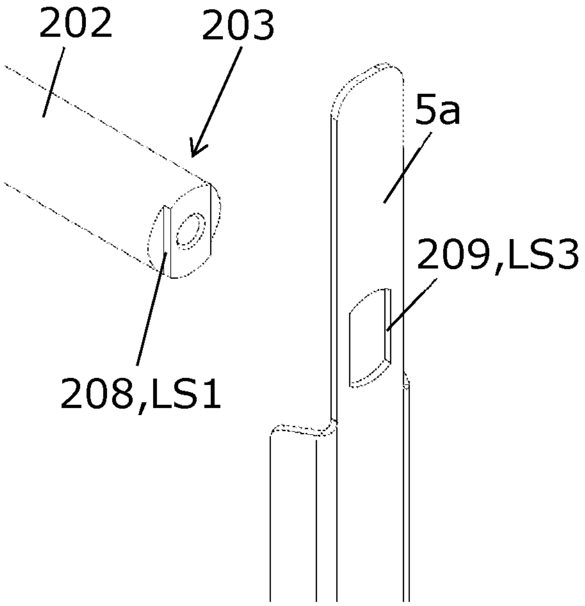
Figure 3C:
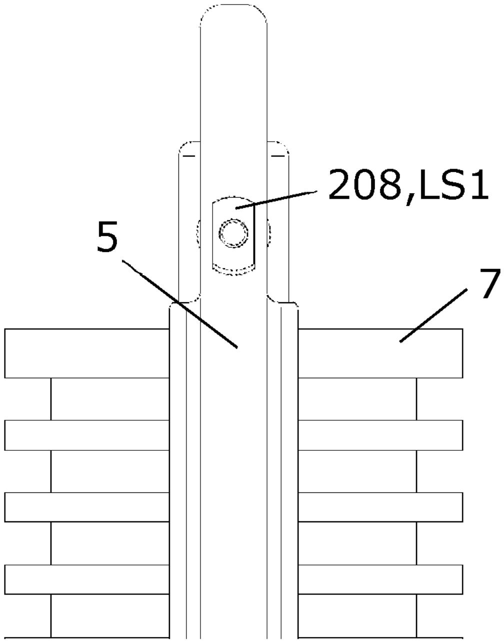

FIGS. 3A, 3B, and 3C schematically show the region around the connection between the connector pin 202 and the discharge electrode 5 in FIGS. 2A and 2B; i.e. the design of the first and third locking surfaces LS1,LS3. In these figures, the angle of view is different from the one in FIGS. 2A and 2B to more clearly show the relevant details. FIGS. 3A and 3B show exploded three-dimensional views, and FIG. 3C shows an end view after assembly of the first and third locking surfaces LS1,LS3. In the illustrated embodiment, the first locking surface LS1 is a protrusion 208 extending from the first end 203 of the connector pin 202, and the third locking surface LS3 is a locking hole 209 in the first discharge electrode part 5*a*, the locking hole 209 matching the shape and dimensions of the protrusion 208 so that the mutual engagement and thus locking is established via the circumferential edges. In this embodiment, the mutual connection between the first and third locking surfaces LS1,LS3 is releasably established by use of a button head screw 210 inserted through a hole 211 in the second discharge electrode part 5*b* and axially into a threaded hole 212 in the connector pin 202 as shown in the figure.

Figure 4B:
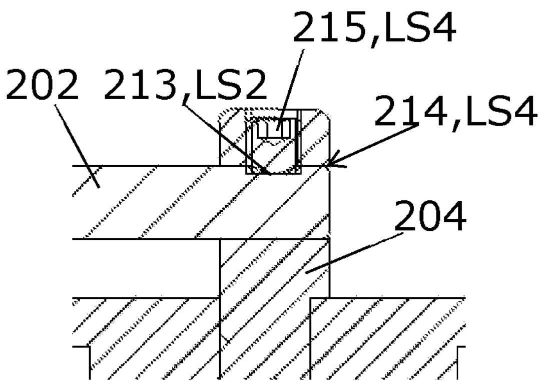
Figure 4C:
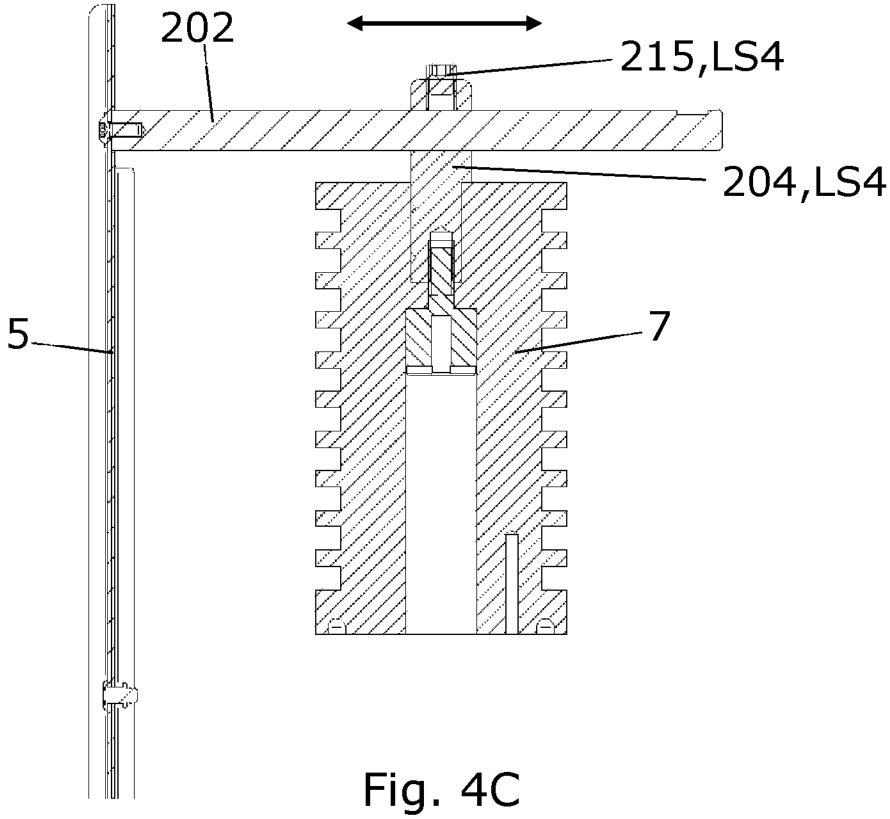

FIGS. 4A, 4B and 4C schematically show the connection between the connector pin 202 and the isolator 7 in FIGS. 2A and 2B. FIG. 4A shows the whole discharge electrode assembly 201, and FIG. 4B shows the region around the second and fourth locking surfaces LS2,LS4. The second locking surface LS2 is a recess 213 in the connector pin 202; see also FIG. 3A. The fourth locking surface LS4 is a combination of a guiding hole 214 in the insulator connector 204 configured to receive the second end 205 of the connector pin 202 and a set screw 215 configured to fixedly engage with the recess 213 when the connector pin 202 is at a predefined position in the guiding hole 214. The mutual engagement between the second and the fourth locking surfaces LS2,LS4 is releasable by loosening the set screw 215 again. As seen in the figures, the insulator connector 204 comprises the guiding hole 214, and the connector pin 202 is configured to slide along the guiding hole 214 in the insulator connector 204 to allow for movement the discharge electrode 5 relative to the insulator 7.

FIG. 4A also illustrates that the insulator connector 204 comprises a fifth locking surface LS5, the insulator 7 comprises a sixth locking surface LS6, and the fifth and the sixth locking surfaces LS5,LS6 are configured to form a fixed mutual engagement preventing translational and rotational movement of the insulator connector 204 in relation to the insulator 7.

FIG. 4C schematically shows the possible sliding of the discharge electrode 5 relative to the isolator 7. Loosening of the set screw 215 therefore allows for easy disassembling for cleaning of the discharge electrode 5 as well as for chimney sweeping. The discharge electrode 5 can either be removed completely or retracted so that it is positioned along the wall of the pipe 4 forming the flow passage in which the discharge electrode 5 is arranged during use.

The insulator 7 is arranged between the discharge electrode 5 (negative polarity) and the location where the insulator 13 is mounted on the casing of the ESP (grounded—positive polarity). The insulator 7 prevents a shortcut between the two poles (i.e. the discharge electrode and the collection electrode). As shown FIGS. 4A and 4C, the insulator 7 comprises a central hole via which a high voltage cable (not shown) can pass through the insulator 7 and be connected to the discharge electrode 5 via the connector pin 202. The other end of this cable is connected to the high voltage generator 6; see FIG. 1.

Figure 5:
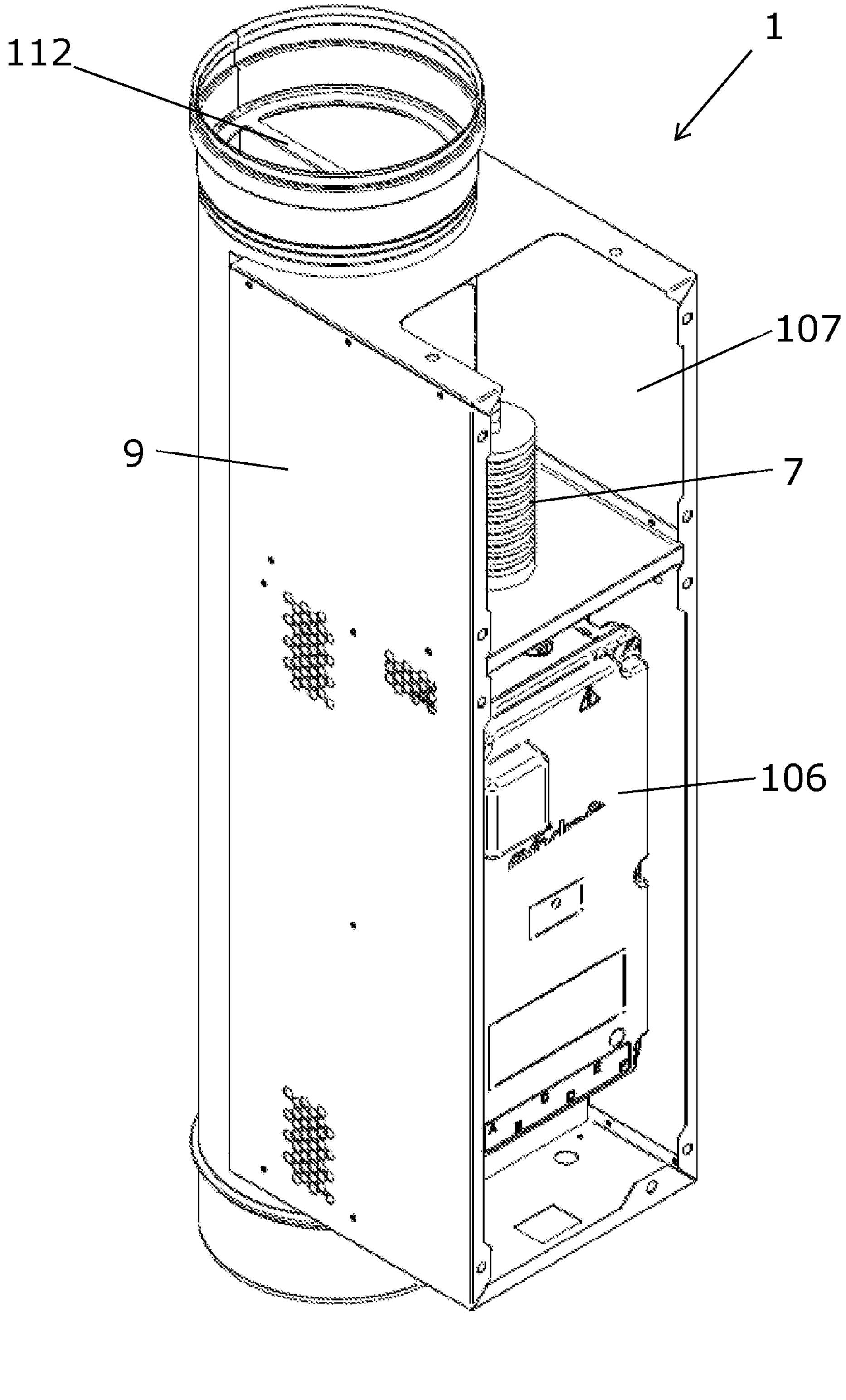
FIG. 5 schematically shows a three-dimensional view of an embodiment of an electrostatic precipitator unit according to the second aspect of the invention.

FIG. 5 schematically shows a three-dimensional view of an embodiment of an electrostatic precipitator unit 1 according to the second aspect of the invention. The cover plate 104 (see FIG. 6) and the upper lid (not shown) have been removed to reveal the location of the control box 106 forming a unitary enclosure in which the controller 8 and the high voltage generator 6 are arranged. In this embodiment, the insulator 7 is arranged in a separate fourth compartment 107 above the compartment housing the control box 106. The plate onto which the insulator 7 is fixedly mounted is mounted to extend perpendicular to the pipe 4 forming the flow passage. Hereby it can be ensured that a longitudinal axis of the insulator 7 and the central axis of the pipe are parallel. The upper lid can e.g. be removed for inspection of the electrostatic precipitator unit or when it is necessary to clean the discharge electrode 5. The electrostatic precipitator unit 1 comprises a brush stop 112 configured to be arranged at the flue gas outlet 3 and extending across the flow passage. The brush stop is configured to prevent a sweeping brush from passing the brush stop 112 when the electrostatic precipitator unit is inserted in the flue gas passageway.

Figure 6:
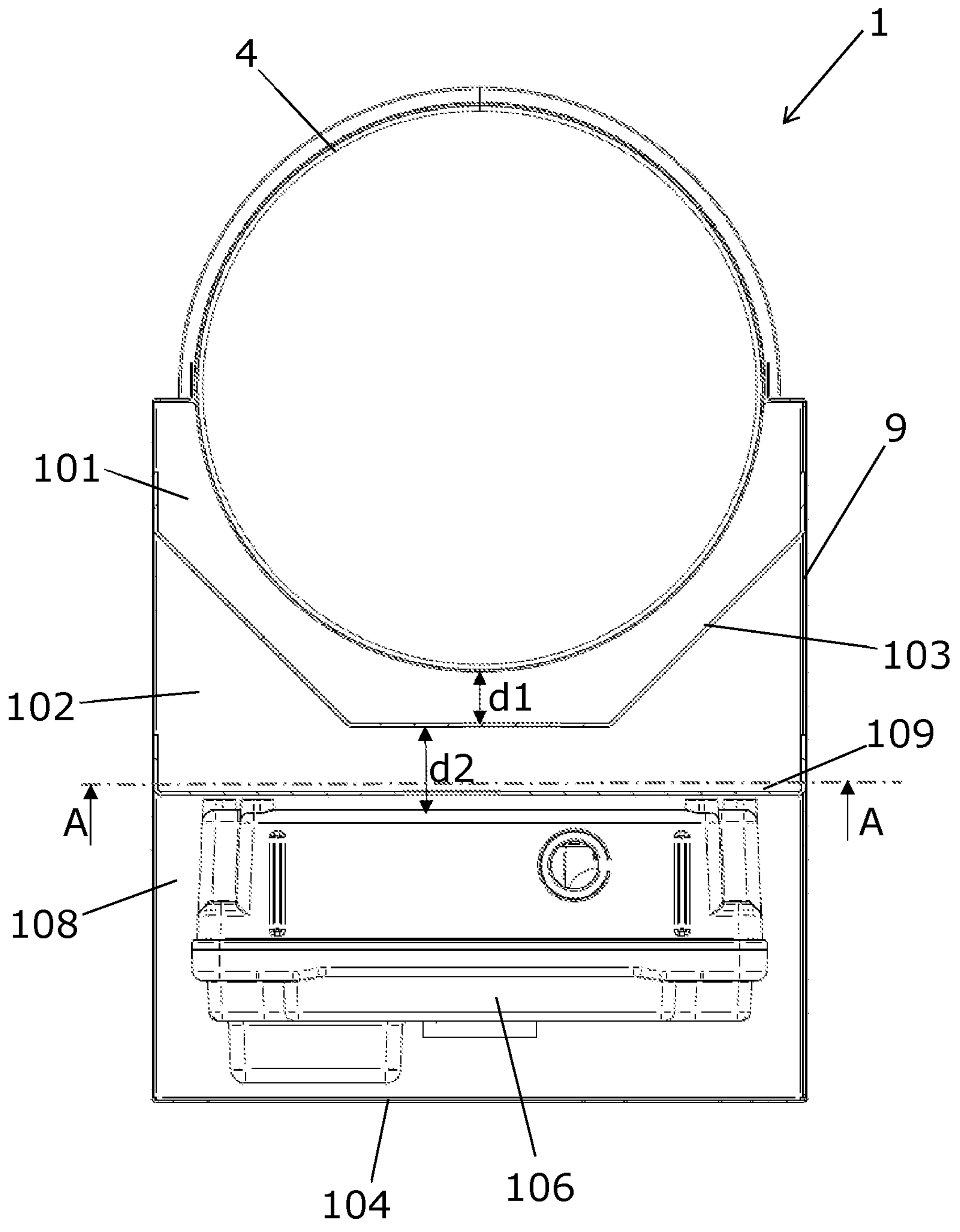
FIG. 6 is a cross-sectional top view of the embodiment in FIG. 5 with the horizontal section being made just above the control box.

FIG. 6 is a cross-sectional top view of the embodiment in FIG. 5 with the horizontal section being made just above the control box 106. The discharge electrode 5 and the connection between the discharge electrode 5 and the high voltage generator 6 via the insulator 7 cannot be seen in this view. This figure clearly shows how the casing 9 extends laterally from the pipe 4. The figure further shows the first compartment 101 adjacent to the pipe 4 and the second compartment 102 at a distance from the pipe 4 and separated from the first compartment 101 by the heat shield plate 103. In this embodiment, the controller 8 and the high voltage generator 6 are arranged in a control box 106 in a third compartment 108 adjacent to and at least partly separated from the second compartment 102 by a mounting plate 109 supporting the high voltage generator 6 and the controller 8. In the illustrated embodiment, heat shield plate 103 is bent so that a horizontal distance between the heat shield plate 103 and both the controller 8 and the high voltage generator 6 is larger adjacent to the walls of the casing 9 than midway between the walls of the casing 9. As clearly seen in FIG. 6, this allows for a large space along which the cooling air can flow along the second compartment 102. In some embodiments of the invention, a shortest horizontal distance d1 between the pipe 4 and the heat shield plate 103 is at least mm, such as at least 13 mm, such as at least 15 mm. Furthermore, in some embodiments of the invention, a shortest horizontal distance d2 between the heat shield plate 103 and both the controller 8 and the high voltage generator 6 is at least 15 mm, such as at least 18 mm, such as at least 20 mm.

In the embodiment illustrated in FIG. 6, the control box 106, housing the controller 8 and the high voltage generator 6, is arranged in the third compartment 108 adjacent to and at least partly separated from the second compartment 102 by a mounting plate 109 for carrying the control box 106. The control box 106 of this embodiment forms a unitary enclosure which is mounted to the mounting plate 109 by bolts, but other ways of mounting, such as clamps or brackets, are also covered by the scope of protection.

Figure 7:
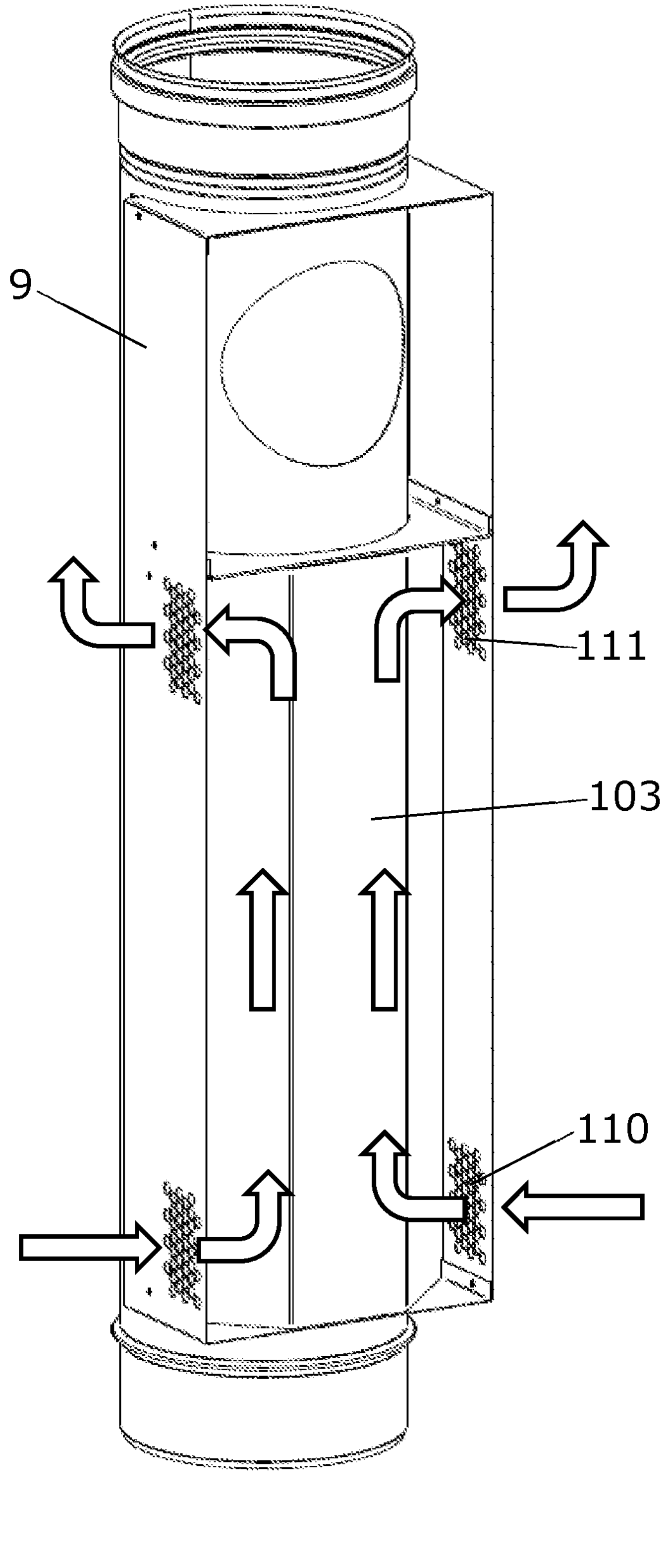
FIG. 7 is a three-dimensional sectional view with the section being along line A-A in FIG. 6.

FIG. 7 is a three-dimensional sectional view with the section being made along line A-A in FIG. 6. The figure shows that the walls of the casing are provided with lower holes 110 at a lower region of the second compartment 102 and upper holes 111 at an upper region of the second compartment 102. The lower holes 110 and upper holes 111 are provided in two opposing walls of the casing 9. The lower holes 110 are configured to allow air to be drawn into the second compartment 102 from the surroundings, and upper holes 111 are configured to allow air to be vented out of the second compartment 102. As described above, the lower and upper holes 110,111 thereby cause a flow of air along the second compartment 102 as a result of thermal convection caused by hot flue gas flowing in the flow passage during use of the electrostatic precipitator unit. The flow of air is illustrated with arrows in FIG. 7.

Although the present invention has been described in connection with the specified embodiments, it should not be construed as being in any way limited to the presented examples. The scope of the present invention is set out by the accompanying claim set. In the context of the claims, the terms “comprising” or “comprises” do not exclude other possible elements or steps. Also, the mentioning of references such as “a” or “an” etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A system for an electrostatic precipitator unit configured for insertion in a flue gas passageway, comprising:

a flue gas inlet configured to receive a flow of flue gas, a flue gas outlet configured to vent the flow of flue gas, a pipe forming a flow passage extending between the flue gas inlet and the flue gas outlet, and a discharge electrode assembly, wherein the discharge electrode assembly comprises:

a discharge electrode arranged in the flow passage and configured to be electrically connected to an associated high voltage generator, which provides an electric field in a region around the discharge electrode during use, an insulator arranged between the associated high voltage generator and the discharge electrode during use, the insulator having a longitudinal axis fixedly arranged parallel to a central axis of the pipe forming the flow passage, a connector pin connected to the discharge electrode at a first end, and an insulator connector connecting the insulator and a second end of the connector pin, wherein:

the connector pin comprises a first locking surface at the first end and a second locking surface at the second end, the discharge electrode comprises a third locking surface at an upper end, the insulator connector comprises a fourth locking surface, and a fifth locking surface, and the insulator comprises a sixth locking surface, wherein:

the first and the third locking surfaces are configured to form a fixed mutual engagement preventing translational and rotational movement of the discharge electrode in relation to the connector pin, the second and the fourth locking surfaces are configured to form a fixed mutual engagement preventing translational and rotational movement of the connector pin in relation to the insulator connector, and the fifth and the sixth locking surfaces are configured to form a fixed mutual engagement preventing translational and rotational movement of the insulator connector in relation to the insulator, so that when all the locking surfaces are in their respective mutual engagements, a longitudinal axis of the discharge electrode is aligned with the central axis of the pipe.

2. The system according to claim 1, wherein:

the mutual engagement between the first and the third locking surfaces is releasable, and/or the mutual engagement between the second and the fourth locking surfaces is releasable.

3. The system according to claim 1, wherein:

the first locking surface is a protrusion extending from the first end of the connector pin, and the third locking surface is a locking hole matching the shape and dimensions of the protrusion.

4. The system according to claim 1, wherein:

the second locking surface is a recess in the connector pin, and the fourth locking surface is a combination of:

a guiding hole in the insulator connector configured to receive the second end of the connector pin, and a set screw configured to fixedly engage with the recess when the connector pin is at a predefined position in the guiding hole.

5. The system according claim 4, wherein:

the insulator connector comprises the guiding hole, and the connector pin is configured to slide along the guiding hole in the insulator connector to allow for movement of the discharge electrode relative to the insulator.

6. The system according to claim 1, wherein the discharge electrode comprises a first discharge electrode part and a second discharge electrode part, wherein the first and second discharge electrode parts are aligned and releasably and fixedly connected to each other during use of the discharge electrode.

7. An electrostatic precipitator unit for insertion in a flue gas passageway, comprising:

a system according to claim 1, a high voltage generator connected to the discharge electrode configured to provide an electric field in a region around the discharge electrode, when the high voltage generator is turned on, and a controller for controlling the operation of the high voltage generator and the discharge electrode.

8. The electrostatic precipitator unit according to claim 7, further comprising a casing extending laterally from the pipe, the casing comprising:

a first compartment adjacent to the pipe, and a second compartment at a distance from the pipe and separated from the first compartment by a heat shield plate along at least a part of a height of the first compartment, wherein the controller and the high voltage generator are arranged:

in the second compartment, or in a third compartment adjacent to and at least partly separated from the second compartment by a mounting plate supporting the high voltage generator and the controller, and wherein walls of the casing are provided with:

at least one lower hole at a lower region of the second compartment, and at least one upper hole at an upper region of the second compartment, the at least one lower hole being configured to allow air to be drawn into the second compartment from the surroundings and the at least one upper hole being configured to allow air to be vented out of the second compartment thereby causing a flow of air along the second compartment as a result of thermal convection caused by hot flue gas flowing in the flow passage during use of the electrostatic precipitator unit.

9. The electrostatic precipitator unit according to claim 8, wherein the heat shield plate is bent or curved so that a horizontal distance between the heat shield plate and both the controller and the high voltage generator is larger adjacent to the walls of the casing than midway between the walls of the casing.

10. The electrostatic precipitator unit according to claim 7, wherein both the at least one lower hole and the at least one upper hole are provided in two opposing walls of the casing.

11. The electrostatic precipitator unit according to claim 7, wherein the insulator is arranged in a fourth compartment of the casing, the fourth compartment being above and at least partly separated from the second or third compartment in which the controller and the high voltage generator are arranged.

12. The electrostatic precipitator unit according to claim 7, wherein the controller and the high voltage generator are arranged in a control box forming a unitary enclosure.

13. The electrostatic precipitator unit according to claim 7, further comprising a brush stop arranged at the flue gas outlet and extending across the flow passage, the brush stop being configured to prevent a sweeping brush from passing the brush stop when the electrostatic precipitator unit is inserted in the flue gas passageway.

* * * * *